United States Patent Office 3,408,315
Patented Oct. 29, 1968

3,408,315
NYLON MEMBRANE FILTER
Richard A. Paine, Bedford, Mass., assignor to Millipore Filter Corporation, Bedford, Mass., a corporation of Massachusetts
No Drawing. Filed Jan. 12, 1965, Ser. No. 425,046
3 Claims. (Cl. 260—2.5)

ABSTRACT OF THE DISCLOSURE

A process for producing a microporous nylon plastic membrane filter comprising applying to a smooth casting surface a uniform layer of a nylon-solvent containing composition having a thickener which regulates the viscosity of the composition from about 500 to 1000 cps. (Brookfield measured at 70° to 80° F.), subjecting the composition to two separate evaporating stages to first remove the organic solvent and then water, forming the membrane filter and removing the thickener from the filter.

---

This invention provides a microporous plastic membrane filter and has for its object the provision of an improved nylon microporous plastic membrane filter and a process for producing the filter. The invention is particularly concerned with filters formed of alcohol-soluble nylon and provides a process for forming the plastic membrane filter in any desired sizes from small sections to continuous or uninterrupted lengths, having a high degree of uniformity and continuity resulting in superior nylon membrane filters. The process comprises the preparation of a casting solution having such viscosity due to its physical and chemical properties that it can be applied effectively in a layer of uniform desired thickness on a smooth surface on which it is transformed into the plastic membrane filter.

In practicing the process of the invention the nylon is first dissolved in an organic solvent which is formulated into a casting solution or composition in a miscible solvent mixture of an alcohol and water which on evaporation transforms the composition to a plastic membrane filter having pores varying, say, from 0.25 micron to several microns. I have discovered that in order to carry out the process effectively and to form improved nylon membrane filters that the casting solution must have a viscosity varying from about 500 to about 1000 cps. (Brookfield measured at 70° to 80° F.), and to achieve this viscosity a suitable thickener compatible with the components of the solution is incorporated therein.

The alcohol-soluble nylon known as nylon terpolymer which may be prepared in accordance with the Brubaker et al. U.S. Patent 2,285,009 is particularly advantageous for forming the filter of the invention. A suitable commercially available alcohol-soluble nylon of this type is sold by the Du Pont Company under the name Zytel–61 nylon. The nylon is dissolved in methyl or ethyl alcohol, preferably with the aid of a chlorinated hydrocarbon such as methylene chloride, and the resulting base solution is mixed with a miscible solvent mixture of an alcohol such as ethyl alcohol and water to form the nylon solution which has the essential components to form a microporous plastic membrane filter. Other suitable chlorinated hydrocarbons include ethylene chloride, tetrachloro ethane, and chloroform. However, this solution lacks the viscosity to be suitable for practical membrane filter production and particularly for applying on a smooth surface a uniform layer of solution of the desired thickness, and in accordance with the process of my invention I incorporate in the nylon solution a thickener or viscosity increasing agent which is compatible with the nylon and the solvents. It is important also that the thickener not modify or interfere with the pore formulation and be removable in a simple washing operation from the completely formed porous filter. The improved casting solution of the invention has the important combination of properties making it possible to form on a smooth surface, such as a glass or metal surface, a uniform, continuous and coherent layer of the desired thickness which on heating releases the gases from solution so as to leave the porous structure. Most advantageously, the thickener is one which does not interfere with the release of gases and the formation of pores, leaving the nylon filter unaltered after removal of the thickener.

It is convenient to add the viscosity increasing agent into this alcohol nylon solution prior to adding the miscible solution of alcohol and water. A thickener, preferably in an alcohol solution, is added to increase the viscosity very appreciably so that a uniform layer for example about 150μ (6 mils) thick, can be cast or doctored onto a smooth surface such as a glass plate or a traveling metal belt. A thickener such as a carboxy-vinyl polymer, and a small amount of an amine, such as di-isopropyl amine, triethylamine, or triamylamine, in solution in an alcohol of the kind used in the nylon solution, is very effective. The nylon-containing solution and the solution of thickener are blended together and then the miscible solvent mixture is added. In another and equally effective sequence of operations the miscible solvent mixture of an alcohol such as methyl or ethyl alcohol and water is mixed with the nylon solution and then the alcohol solution of thickener is blended into the nylon-containing solution. In either sequence, the thickener is added in such amount to the nylon-containing casting composition to increase the viscosity to the effective range of about 500 to about 1000 cps. (Brookfield) at the casting temperature which varies from about 70° to 80° F.

The process of the invention comprises applying a uniform layer of the viscous nylon-containing composition onto a smooth casting polished surface such as a glass plate or metal belt, on which it is subjected to a series of processing stages resulting in the final porous membrane product which may be of limited dimensions or a continuous sheet or film of indefinite length which can be wound into a roll.

In an advantageous operation the viscous nylon composition is cast onto a metal belt and is doctored to a uniform layer which is relatively thick in comparison to the resulting finished membrane filter. The solution on the smooth surface on which it is cast is subjected to evaporation in a closed chamber in which the temperature is about 70° F. and the humidity is desirably at about 100%. It is important to subject the solution on the smooth surface to this high humidity atmosphere because this retards the evaporation of water while permitting the organic solvents to evaporate and this selective evaporation transforms the nlyon-containing solution, first to a gel, and then to a white porous relatively tough sheet or film. The composition is maintained in the initial processing chamber for approximately 30 minutes to effect the transformation from the viscous liquid to a stable gel state. After the porous structure has formed, the sheet is subjected to air exchange (which may be supplemented by heating), to remove residual volatile matter. This may be done by subjecting the porous structure to a higher temperature in a chamber maintained at a temperature up to about 150° F. In this transition from a clear solution to a gel and then to a white thin plastic membrane sheet the microporous structure forms the total pore volume which consists of from about 65 to 85% of the total volume of the sheet. The casting solution may be dyed to form a colored filter.

The plastic membrane sheet which has the final porous structure and is free of solvents is drawn through a solvent for the thickener, to wash the thickener out of the filter. When a thickener as above described is used the filter is washed in a slightly acid water solution at a temperature of from 120° to 140° F. to extract the thickener. The acid converts the thickener to a water soluble form which can be flushed out and discarded. The washed sheet is dried by low heat and may then be packed in any suitable manner. The continuous filter sheets may be wound into a roll.

Suitable alterations may be made in the viscous nylon-containing composition or in the processing steps in order to alter the resulting pore size and structures. In order to increase the resulting pore size of the filter, one or more of the following steps may be taken:

1. Reduce the relative humidity in the processing chambers.
2. Increase the air exchange rate in the processing chambers.
3. Increase the solid content of the basic formulation.
4. Decrease the miscible non-solvent content of the basic formulation.
5. Increase the ratio of methyl alcohol to methylene chloride used in dissolving the nylon.

To decrease the pore size, one or more of the above steps may be applied in reverse.

The following are examples of operations for producing a nylon plastic membrane filter according to the invention:

Example I

A nylon solution is prepared by placing 15 grams of alcohol-soluble nylon Zytel–61 nylon chips in a mixture of 82 grams of methylene chloride and 39 grams of ethyl alcohol. This mixture is heated to 130° F. and maintained at this temperature with continuous agitation until a homogeneous solution results which is the nylon base solution.

A thickener composition is prepared by adding 2 grams of a carboxy-vinyl polymer as a finely divided solid to 100 grams of methyl alcohol which is stirred vigorously to achieve a uniform dispersion. A suitable high molecular weight carboxy-vinyl polymer is sold by B. F. Goodrich Chemical Company under its trade name Carbopol 934. Upon completion of the dispersion step, 2 grams of triethylamine is added to the mixture with good agitation. A viscous gel structure appears immediately. To produce a nylon composition for casting on a smooth surface having the viscosity in the range of about 500–1000 cps., 20 grams of this thickener application is mixed with 136 grams of the nylon base solution. To this nylon base solution and thickener composition a miscible solvent mixture composed of about 18 grams of ethyl alcohol and 27 grams of water is mixed with the thickener nylon base solution. The water is the non-solvent component of the mixture.

The resulting nylon-containing composition can be cast on any smooth surface desired, such as smooth glass or metal surfaces and when suitably processed as described above, the porous membrane filter can be formed. The thickener composition of the type described is a gelatinous material which has served its purpose after the porous structure has been formed and must be removed. The completely formed plastic porous membrane filter is removed from the casting surface and immersed in a 0.1% aqueous acetic acid bath for 5 minutes at 120° F., to extract the thickener which is followed by washing with distilled water to remove the acid solution. The amount and type of acid used to remove the thickener are not critical. In practice glacial acetic acid or hydrochloric acid may be used.

Evaluation of the filter formed in the above Example I using air flow rates, water flow rates, mercury instrusion and particle retention, indicated an average pore size of $7\mu$.

In the foregoing example the thickener may be added after the addition of the miscible solvent mixture. The following example illustrates the formation of a suitable nylon-containing composition of the desired viscosity containing a thickener which is not washed out of its final plastic filter.

Example II

In this example the nylon, Zytel–61 nylon, was dissolved as in the first step of Example I to form a nylon base solution and to this solution was added 136 grams of a miscible solution consisting of 38 grams of ethyl alcohol and 27 grams of water. The water is a non-solvent component of the nylon in the alcohol solution. These components were blended with good agitation, and had a viscosity in the order of 15 cps. (Brookfield at 70° F.) which will not produce a continuous uniform casting layer.

To the solution of nylon base and miscible-solvent mixture was added with good agitation, 5 grams of Cab-O-Sil. This material, marketed by the Cabot Corporation, is described as a "submicroscopic pyrogenic silica" and is effective for viscosity modification as a thickener. The completed mixture is allowed to stand for two hours to permit the escape of small air bubbles. The resulting viscosity was 500–600 cps. (Brookfield at 70° F.).

This invention provides an improved microporous nylon plastic membrane filter having exceptional dimensional and pore size uniformity, strength and flexibility. The solvent resistance characteristic of nylon overcomes many of the limitations of the widely used cellulose ester filters which deteriorate in many systems in which alcohol-soluble nylon is stable.

The improved filter has a wide field of uses for filtering out of various liquids, or gases, cells, microorganisms and minute particles, and for sterilizing biological solution, and the like.

I claim:

1. The process for producing a microporous nylon plastic membrane filter which comprises applying onto a smooth casting surface a uniform layer of nylon-containing composition having a viscosity from about 500 to about 1000 cps. (Brookfield at a temperature of about 70° F.), said nylon-containing composition comprising an alcohol-soluble nylon in solution in a miscible solution of an alcohol of the group consisting of methyl and ethyl alcohol and water, a removable thickener dissolved in the composition to bring said composition to a viscosity from about 500 to about 1000 cps. (Brookfield at a temperature of about 70° F.), said thickener being compatible with the nylon and solvents and nonreactive in the pore formation of said filter, subjecting the nylon-containing composition on the casting surface to an evaporation stage in an atmosphere of high relative humidity and selectively evaporating the organic solvent, and then in another evaporation stage in an atmosphere of reduced humidity and evaporating the water and any residual volatile matter, forming the microporous nylon plastic membrane filter, and thereafter removing the thickener from the membrane filter.

2. In the process of claim 1 wherein said alcohol-soluble nylon in solution further includes a chlorinated hydrocarbon of the group consisting of methylene chloride, ethylene chloride, tetrachloro ethane and chloroform.

3. In the process of claim 1 wherein said thickener is soluble in water or dilute acid and can be washed out of the filter with water or dilute acid, and washing out the thickener and drying the filter.

References Cited

UNITED STATES PATENTS

| | | | |
|---|---|---|---|
| 2,772,322 | 11/1956 | Witt et al. | 260—2.5 |
| 2,783,894 | 3/1957 | Lovell et al. | 260—2.5 |
| 3,022,542 | 2/1962 | Davis | 260—2.5 |

FOREIGN PATENTS 938,694  10/1963  Great Britain.

MURRAY TILLMAN, *Primary Examiner.*

M. J. TULLY, *Assistant Examiner.*